(12) United States Patent
Kim et al.

(10) Patent No.: US 11,491,582 B2
(45) Date of Patent: Nov. 8, 2022

(54) ELECTRODE LEAD CUTTING APPARATUS FOR BATTERY CELLS

(71) Applicant: LG CHEM, LTD., Seoul (KR)

(72) Inventors: Min Chan Kim, Daejeon (KR); Ju Hwan Baek, Daejeon (KR); Heung Kun Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/961,957

(22) PCT Filed: Nov. 13, 2019

(86) PCT No.: PCT/KR2019/015389
§ 371 (c)(1),
(2) Date: Jul. 14, 2020

(87) PCT Pub. No.: WO2020/105939
PCT Pub. Date: May 28, 2020

(65) Prior Publication Data
US 2020/0406402 A1    Dec. 31, 2020

(30) Foreign Application Priority Data

Nov. 23, 2018 (KR) .................. 10-2018-0145971

(51) Int. Cl.
*B23K 26/38* (2014.01)
*H01M 50/531* (2021.01)

(52) U.S. Cl.
CPC ........... *B23K 26/38* (2013.01); *H01M 50/531* (2021.01)

(58) Field of Classification Search
CPC .......... B23K 26/38; B23K 26/00; B26D 7/01; B26D 1/06; B26D 1/065; B26D 7/00;
(Continued)

(56) References Cited

U.S. PATENT DOCUMENTS

| | | | |
|---|---|---|---|
| 6,486,436 B1* | 11/2002 | Shah | B23Q 3/1546 219/121.82 |
| 2013/0097853 A1* | 4/2013 | Kitagawa | H01M 10/0413 29/623.1 |

(Continued)

FOREIGN PATENT DOCUMENTS

| | | |
|---|---|---|
| CN | 1979924 A | 6/2007 |
| CN | 204800154 U | 11/2015 |

(Continued)

OTHER PUBLICATIONS

International Search Report (PCT/ISA/210) issued in PCT/KR2019/015389 dated Feb. 21, 2020.
(Continued)

*Primary Examiner* — Joel M Attey
*Assistant Examiner* — Adam Michael Eckardt
(74) *Attorney, Agent, or Firm* — Birch, Stewart, Kolasch & Birch, LLP

(57) ABSTRACT

Discussed is an electrode lead cutting apparatus for battery cells, the electrode lead cutting apparatus including a cell fixing unit configured to fix a battery cell, an electrode lead fixing unit configured to supply air to an electrode lead of the battery cell in order to fix a point of the electrode lead to be cut, and an electrode lead cutting unit configured to cut the point of the electrode lead to be cut.

13 Claims, 4 Drawing Sheets

(58) Field of Classification Search
CPC .. B26D 7/0006; Y02E 60/10; H01M 10/0404; H01M 10/052; H01M 2220/30; H01M 50/105; H01M 50/531; H01M 50/20; H01M 2200/20; H01M 50/10; H01M 50/172; H01M 50/30; H01M 50/572; H01M 50/578
See application file for complete search history.

(56) References Cited

U.S. PATENT DOCUMENTS

| | | | |
|---|---|---|---|
| 2013/0146573 A1* | 6/2013 | Hamaguchi | B23K 26/14 219/121.72 |
| 2014/0014702 A1* | 1/2014 | Yuhara | H01M 10/0404 226/88 |
| 2014/0020240 A1 | 1/2014 | Watanabe et al. | |
| 2014/0227582 A1 | 8/2014 | Nakashima | |
| 2018/0093388 A1* | 4/2018 | Yun | H01M 50/557 |
| 2020/0119329 A1 | 4/2020 | Hong et al. | |

FOREIGN PATENT DOCUMENTS

| | | |
|---|---|---|
| CN | 205167025 U | 4/2016 |
| CN | 207105103 U | 3/2018 |
| CN | 208033936 U | 11/2018 |
| JP | 63-178347 U | 11/1988 |
| JP | 5-95806 U | 12/1993 |
| JP | 9-320567 A | 12/1997 |
| JP | 1004-186635 A | 7/2004 |
| JP | 2012-3960 A | 1/2012 |
| JP | 2014-35811 A | 2/2014 |
| JP | 2015-106442 A | 6/2015 |
| KR | 10-2004-0026543 A | 3/2004 |
| KR | 10-0865166 B1 | 10/2008 |
| KR | 10-2010-0093986 A | 8/2010 |
| KR | 10-1255628 B1 | 4/2013 |
| KR | 10-1311912 B1 | 9/2013 |
| KR | 10-1365338 B1 | 2/2014 |
| KR | 10-2015-0049462 A | 5/2015 |
| KR | 10-1591758 B1 | 2/2016 |
| KR | 10-1813249 B1 | 12/2017 |
| KR | 10-1816254 B1 | 2/2018 |
| KR | 10-2018-0037488 A | 4/2018 |
| TW | M461498 U1 | 9/2013 |

OTHER PUBLICATIONS

Extended European Search Report for European Application No. 19887330.9, dated Dec. 13, 2021.

* cited by examiner

[FIG. 1]
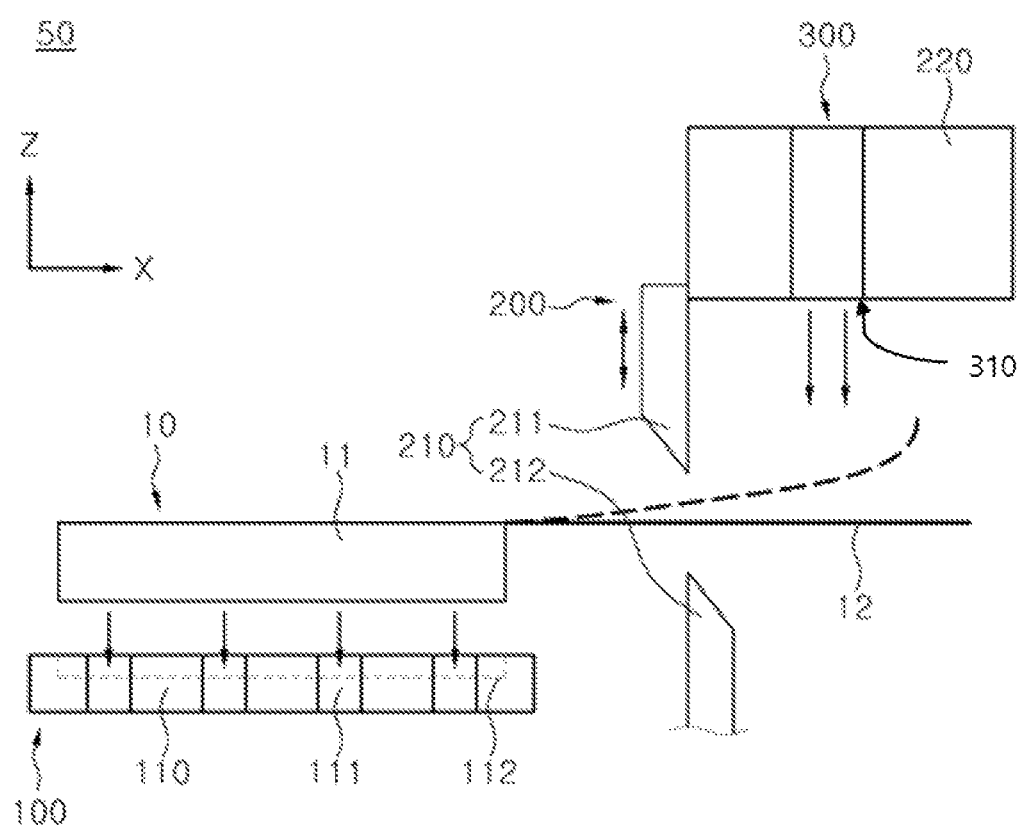

[FIG. 2]
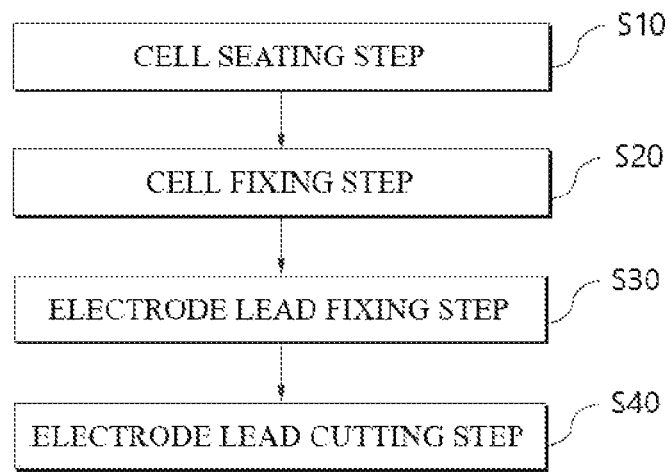

[FIG. 3]
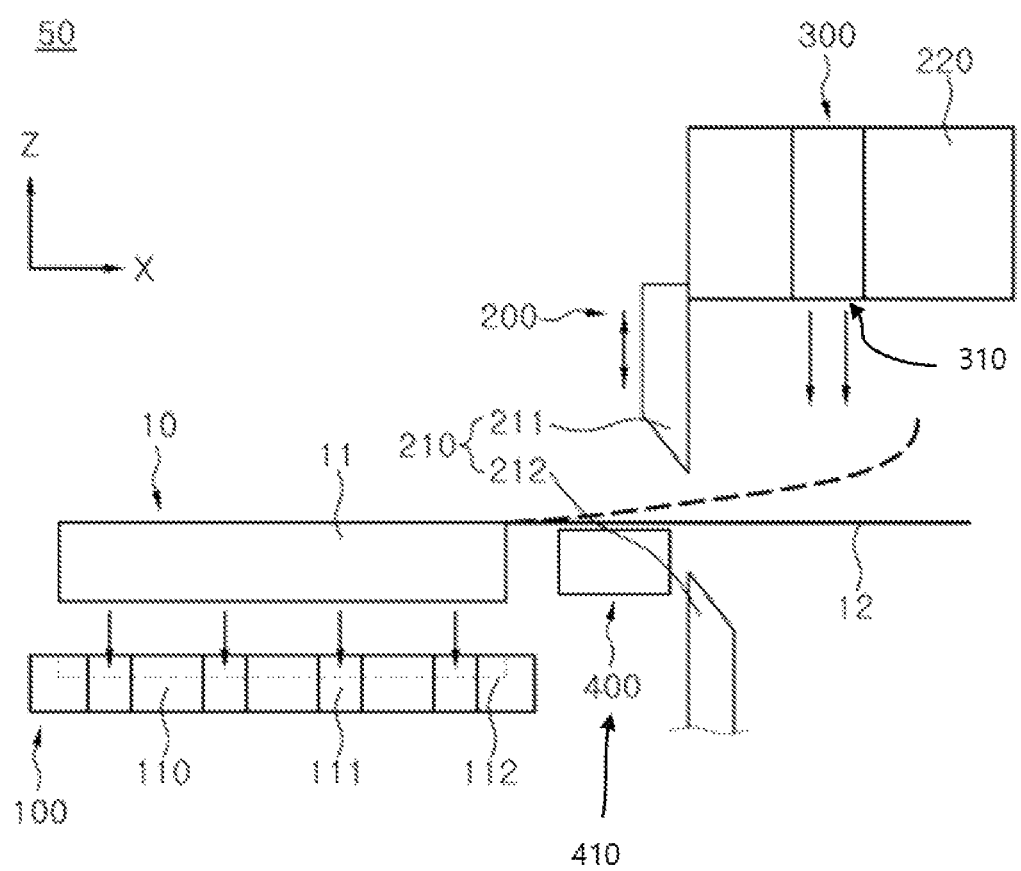

[FIG. 4]
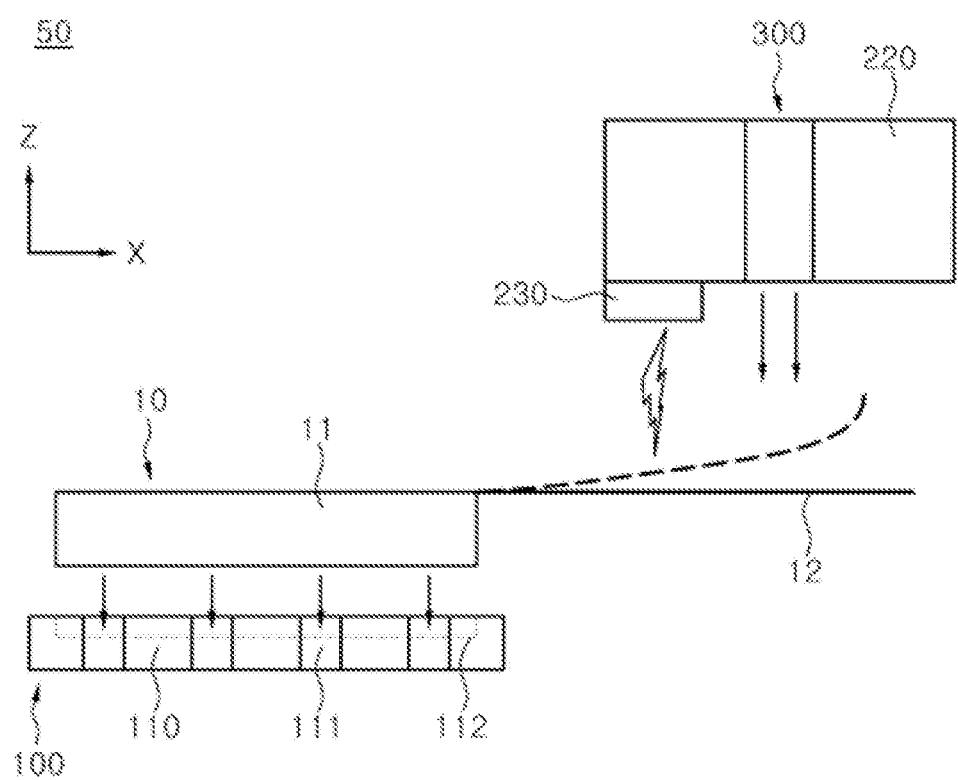

ELECTRODE LEAD CUTTING APPARATUS FOR BATTERY CELLS

TECHNICAL FIELD

The present invention relates to an electrode lead cutting apparatus capable of cutting an electrode lead of a battery cell to the setting length of the electrode lead.

BACKGROUND ART

In recent years, as mobile devices have been increasingly developed and the demand for such mobile devices has increased, the demand for secondary batteries that are capable of being charged and discharged as energy sources for such mobile devices has also sharply increased. In addition, a lot of research on secondary batteries that are capable of satisfying various requirements of such mobile devices has been carried out.

In addition, secondary batteries have also attracted considerable attention as power sources for an electric vehicle (EV), a hybrid electric vehicle (HEV), and a plug-in hybrid electric vehicle (Plug-In HEV), which have been proposed to solve problems, such as air pollution, caused by existing gasoline and diesel vehicles using fossil fuels.

Among such secondary batteries is a lithium secondary battery having a high energy density and a high voltage, into which much research has been carried out and which has also been commercialized and widely used. Typically, the demand for a pouch-type battery cell, which has a small thickness, is easily arranged in a stacked state, and is partially deformable, is high in terms of the shape of the battery.

The pouch-type battery cell is configured to have a structure in which an electrode assembly and an electrolytic solution are received in a pouch-type laminate sheet capable of receiving the electrode assembly therein. In a narrow meaning, the laminate sheet is called a "pouch-type battery case," and a resin layer of the laminate sheet is characterized in that the resin layer is fusible by heat.

The pouch-type battery cell is particularly configured to have a structure in which the laminate sheet wraps the electrode assembly such that the electrode assembly is not exposed outside, and is configured to have a structure in which heat and pressure are applied to portions of the laminate sheet to be sealed overlapping at the outer edge of the battery case in order to seal the laminate sheet.

For example, the battery cell is configured to have a structure in which the outer edges of the battery case are sealed in the state in which electrode leads protrude outwards from the battery case. Here, each of the electrode leads is made of a conductive metal material, is formed in a bar shape, and has a polygonal structure having angled corners when viewed in a plan view. In general, the electrode lead is configured to have a long rectangular structure.

The electrode leads are cut to predetermined lengths, e.g. lengths that the electrode leads can easily be connected to a printed circuit board (PCB) (not shown) or an external electric device (not shown), in the state of being inserted into cutting jigs configured to intersect up and down.

Conventionally, however, at the time of cutting each of the electrode leads, the cutting position of the electrode lead may be tilted due to the property of the electrode lead, such as flexibility. As a result, it may be difficult to cut a correct point of the electrode lead to be cut, and therefore the lengths of the electrode leads that are cut may be different from each other, which may cause process defects.

RELATED ART DOCUMENT

Patent Document

Korean Patent Application Publication No. 10-2018-037488

DISCLOSURE

Technical Problem

An embodiment of the present invention provides an electrode lead cutting apparatus capable of accurately cutting a point of an electrode lead to be cut.

Objects of the present invention are not limited to the aforementioned object, and other unmentioned objects and advantages will be understood from the following description.

Technical Solution

An electrode lead cutting apparatus for battery cells according to an embodiment of the present invention may include a cell fixing unit configured to fix a battery cell, an electrode lead fixing unit configured to supply air to an electrode lead of the battery cell in order to fix a point of the electrode lead to be cut, and an electrode lead cutting unit configured to cut the point of the electrode lead to be cut.

In the embodiment of the present invention, the cell fixing unit may include a suction plate configured to suction the battery cell in a vacuum state.

In the embodiment of the present invention, the electrode lead cutting unit may include a cutting blade configured to cut the electrode lead in the state of being in contact with the point of the electrode lead to be cut, and the cutting blade may include a first cutting blade located above the point of the electrode lead to be cut and a second cutting blade located below the point of the electrode lead to be cut. The electrode lead cutting unit may further include a guide block, and at least one of the first cutting blade and the second cutting blade may be coupled to the guide block so as to be movable upwards and downwards.

In the embodiment of the present invention, the electrode lead cutting unit may include a laser oscillator configured to apply a laser beam to the point of the electrode lead to be cut.

In the embodiment of the present invention, the electrode lead cutting apparatus may further include an electrode lead supporting unit disposed under the electrode lead, the electrode lead supporting unit being configured to support the electrode lead. The electrode lead supporting unit may include a magnetic block configured to fix the electrode lead using magnetic force.

In addition, an electrode lead cutting method for battery cells according to another embodiment of the present invention may include a step of loading a battery cell having an electrode lead exposed therefrom, a step of supplying air from above the electrode lead to fix a point of the electrode lead to be cut, and a step of cutting the fixed point of the electrode lead to be cut.

In the embodiment of the present invention, the electrode lead cutting method may further include a step of providing magnetic force from under the electrode lead to fix the electrode lead using the magnetic force at the time of cutting the electrode lead.

DESCRIPTION OF DRAWINGS

The following drawings appended in this specification illustrate preferred embodiments of the present invention, and serve to make it possible to further understand the technical idea of the present invention together with the detailed description of the invention, which will follow. Therefore, the present invention is not necessary to be interpreted in the state of being limited only to matters described in the drawings.

FIG. 1 is a view schematically showing an electrode lead cutting apparatus according to a first embodiment of the present invention.

FIG. 2 is a flowchart schematically showing an electrode lead cutting method according to a first embodiment of the present invention.

FIG. 3 is a view schematically showing an electrode lead cutting apparatus according to a second embodiment of the present invention.

FIG. 4 is a view schematically showing an electrode lead cutting apparatus according to a third embodiment of the present invention.

BEST MODE

Hereinafter, embodiments of the present invention will be described in detail with reference to the accompanying drawings. The present invention may be embodied in various different forms, and is not limited to the embodiments described herein.

In order to clearly describe the present invention, a detailed description of parts having no relation with the essence of the present invention may be omitted, and the same or similar elements are denoted by the same reference numerals throughout the specification.

Also, in the case in which a part "includes" a component, this means that the part may not exclude another component but may further include another component unless otherwise mentioned. The terms used herein are intended only to mention specific embodiments, not to limit the present invention, and may be interpreted as concepts that are understood by a person having ordinary skill in the art to which the present invention pertains unless otherwise defined in this specification.

FIG. 1 is a view schematically showing an electrode lead cutting apparatus according to a first embodiment of the present invention.

Referring to FIG. 1, the electrode lead cutting apparatus 50 includes a cell fixing unit 100, an electrode lead cutting unit 200, and an electrode lead fixing unit 300. In the embodiment of the present invention, the longitudinal direction of an electrode lead in which the electrode lead extends is set to an X-axis direction, the width direction of the electrode lead perpendicular to the X-axis direction is set to a Y-axis direction, and the direction perpendicular to the X-axis and Y-axis directions is set to a Z-axis direction.

A battery cell 10 that is applied to the embodiment of the present invention may be configured to have a structure in which an electrode assembly and an electrolytic solution are received in a pouch sheathing member 11. For example, the battery cell 10 may be a pouch-type battery cell. In addition, the battery cell may be a secondary battery that performs charging and discharging operations.

An electrode lead 12 may be provided outside the pouch sheathing member 11 in a protruding form. One end of the electrode lead 12 is electrically connected to the electrode assembly, and the other end of the electrode lead 12 is exposed outside the pouch sheathing member 11, whereby the electrode lead 12 may serve as a connection terminal of the battery cell 10.

The cell fixing unit 100 fixes the battery cell 10, which is a processing target. The cell fixing unit 100 may include a suction plate 110 configured to suction the battery cell 10 in a vacuum state. The suction plate 110 may be formed in a flat shape such that one surface of the battery cell 10 is seated on the suction plate. The battery cell 10 may be disposed on the suction plate 110 in the horizontal direction. For example, the battery cell 10 may be seated on the suction plate 110 in the form in which the electrode lead 12 exposed outside the electrode assembly extends in the X-axis direction.

At least one vacuum hole 111 may be formed in the suction plate 110. The vacuum hole 111 may be formed through the suction plate 110 in the Z-axis direction. The suction plate 110 may suction a battery cell located so as to correspond to the vacuum hole 111. Consequently, the battery cell may be suctioned on the suction plate 110 in a vacuum state, whereby the battery cell may be stably fixed during cutting of the electrode lead 12.

A seating recess 112 may be formed in one surface of the suction plate 110 on which the battery cell 10 is seated, e.g. the upper surface of the suction plate 110. The seating recess 112 is formed so as to be recessed from the upper surface of the suction plate 110 in a concave shape in the downward direction. The seating recess 112 is formed so as to correspond to the external appearance of the battery cell 10. Consequently, the battery cell 10 may be seated in the seating recess 112, whereby movement of the battery cell in the X-axis or Y-axis direction may be prevented. Therefore, it is possible to improve the accuracy at the time of cutting the electrode lead 12.

As the cell fixing unit 100, a gripper and the like may be applied in addition to the suction plate 110. In the case in which the battery cell 10 is fixed by the gripper and the like, however, the portion of the battery cell 10 fixed by the gripper under pressure may be deformed or damaged. Preferably, therefore, the suction plate 110 is applied as the cell fixing unit 100.

The electrode lead cutting unit 200 cuts the electrode lead 12. The electrode lead cutting unit 200 may include a cutting blade 210 configured to cut the electrode lead 12 in the state of being in contact with the electrode lead. The cutting blade 210 cuts a point of the electrode lead 12 to be cut.

The cutting blade 210 may include a first cutting blade 211 and a second cutting blade 212. The first cutting blade 211 may be located above the point of the electrode lead 12 to be cut, and the second cutting blade 212 may be located below the point of the electrode lead 12 to be cut. The first cutting blade 211 and the second cutting blade 212 may be disposed so as to cut the electrode lead 12 while intersecting each other.

The electrode lead cutting unit 200 may include a guide block 220. The guide block 220 may guide movement of the cutting blade 210 in the Z-axis direction, i.e. the upward-downward movement of the cutting blade, while supporting the cutting blade 210. For example, the first cutting blade 211 and the second cutting blade 212 may be coupled to the guide block 220, and at least one of the first cutting blade 211 and the second cutting blade 212 may be coupled to the guide block 220 so as to be movable upwards and downwards. The guide block 220 may be provided with a guide rail (not shown) configured to guide the upward-downward movement of the cutting blade 210.

The electrode lead fixing unit 300 fixes the electrode lead 12 at the time of cutting the electrode lead 12. An air blower 310 configured to supply air to the electrode lead 12 of the battery cell 10 in order to fix the point of the electrode lead 12 to be cut may be applied as the electrode lead fixing unit 300. The air blower may be mounted to the guide block 220 so as to be located above the electrode lead 12. The air blower may be disposed at a position corresponding to the end of the electrode lead 12. That is, the cutting blade 210 may be disposed at one side of the battery cell 10, and the air blower may be disposed at one side of the cutting blade 210.

At the time of cutting the electrode lead 12, air supplied from the air blower applies pressure to the electrode lead 12, whereby the electrode lead 12 extending in the X-axis direction is disposed in a horizontal state, and the axial direction of the cutting blade 210 becomes perpendicular to the electrode lead 12, and therefore it is possible to provide a correct point of the electrode lead 12 to be cut.

In the case in which the electrode lead 12 is cut in the state of being tilted in one direction, on the other hand, the longitudinal direction of the electrode lead 12 does not become perpendicular to the axial direction of the cutting blade 210. In the case in which electrode lead 12 is cut in this state, there may occur an error between the cutting length and the setting length of the electrode lead 12.

FIG. 2 is a view showing a method of cutting an electrode lead of a battery cell according to a first embodiment of the present invention.

Referring to FIGS. 1 and 2, the electrode lead cutting method includes a cell seating step (S10), a cell fixing step (S20), an electrode lead fixing step (S30), and an electrode lead cutting step (S40).

In the cell seating step (S10), a battery cell 10 is loaded on the suction plate 110. The battery cell 10 may be loaded on the suction plate 110 by a transfer unit, such as a robot arm. An electrode lead 12, which is a target to be cut, may be exposed outside the suction plate 110.

A metal that exhibits high conductivity while not causing a chemical change in the battery may be applied as the electrode lead 12 of the battery cell 10, although not particularly restricted. For example, the electrode lead 12 may be selected from the group consisting of copper (Cu), aluminum (Al), nickel (Ni), iron (Fe), carbon (C), chromium (Cr), manganese (Mn), and an alloy including two or more thereof, and may be formed in the shape of a thin plate having a thickness of 0.1 mm to 1.0 mm.

In the cell fixing step (S20), the battery cell 10 is fixed. Since the seating recess 112 is formed in the suction plate 110 so as to correspond to the external appearance of the battery cell 10, movement of the battery cell 10 loaded on the suction plate 110 in the X-axis or Y-axis direction may be prevented. In addition, the battery cell 10 is suctioned by the suction plate 110, in which the vacuum hole 111 is formed, in a vacuum state, whereby the battery cell may be stably fixed in the cutting process.

In the electrode lead fixing step (S30), a point of the electrode lead 12 to be cut is fixed before cutting the electrode lead 12. That is, the electrode lead 12 may exhibit predetermined flexibility since the electrode lead has a thickness of about 0.1 mm to 1.0 mm. As a result, the cutting operation may be performed on the electrode lead 12 in the state in which the end of the electrode lead is tilted. For example, the electrode lead 12 may be in the state of being tilted upwards. In the case in which the electrode lead 12 is cut in this state, there may occur the difference between the cutting length and the setting length of the electrode lead. In order to prevent this, air is injected from the air blower disposed above the electrode lead 12. In the case in which the air is supplied, the electrode lead 12 is pushed downwards, and the pushed electrode lead 12 is maintained in the horizontal state. Consequently, the point of the electrode lead 12 to be cut may be stably secured.

In the electrode lead cutting step (S40), the electrode lead 12 is cut to the setting length thereof. That is, at least one of the first cutting blade 211 and the second cutting blade 212 is moved upwards and downwards to cut the electrode lead 12 in the state in which the electrode lead 12 is maintained in the horizontal state by the air blower. Since the cutting operation is performed in the state in which the electrode lead 12 is maintained in the horizontal state and the point of the electrode lead 12 to be cut is fixed, as described above, it is possible to minimize an error between the cutting length and the setting length of the electrode lead 12 at the time of cutting the electrode lead.

FIG. 3 is a view schematically showing an electrode lead cutting apparatus according to a second embodiment of the present invention.

Referring to FIG. 3, the electrode lead cutting apparatus 50 includes a cell fixing unit 100, an electrode lead cutting unit 200, an electrode lead fixing unit 300, and an electrode lead supporting unit 400.

Constructions of the cell fixing unit 100, the electrode lead cutting unit 200, and the electrode lead fixing unit 300 are identical or similar to those in the first embodiment, and therefore a detailed description thereof will be omitted.

The electrode lead supporting unit 400 is disposed under an electrode lead 12 to support the electrode lead 12. The electrode lead supporting unit 400 may prevent drooping of the electrode lead 12 at the time of cutting the electrode lead 12. For example, when air is supplied downwards from an air blower located about the electrode lead 12, the electrode lead 12 may be drooped by the pressure at which the air is supplied. The electrode lead supporting unit 400 supports the electrode lead 12 under the electrode lead 12, whereby it is possible to prevent drooping of the electrode lead 12. Consequently, it is possible to secure a correct point of the electrode lead 12 to be cut at the time of cutting the electrode lead.

The electrode lead supporting unit 400 may include a magnetic block 410. The magnetic block may fix the electrode lead 12 using magnetic force. Consequently, the electrode lead 12 may be more securely fixed by the air blower, which supplies air from above the electrode lead 12, and the magnetic block, which fixes the lower side of the electrode lead 12 using magnetic force. Since the fixed state of the electrode lead 12 is secured, it is possible to easily secure the point of the electrode lead 12 to be cut. Consequently, it is possible to minimize an error between the cutting length and the setting length of the electrode lead 12 at the time of cutting the electrode lead.

FIG. 4 is a view schematically showing an electrode lead cutting apparatus according to a third embodiment of the present invention.

Referring to FIG. 4, the electrode lead cutting apparatus 50 includes a cell fixing unit 100, an electrode lead cutting unit, and an electrode lead fixing unit 300.

Constructions of the cell fixing unit 100 and the electrode lead fixing unit 300 are identical or similar to those in the first embodiment, and therefore a detailed description thereof will be omitted.

In the case in which an electrode lead 12 is cut using the cutting blade 210, as in the first embodiment, burrs or electrode particles may be generated on the end surface of the electrode lead 12. The burrs or the electrode particles generated on the end surface of the electrode lead 12 may be mixed in a battery cell 10, whereby performance of the battery cell 10 may be deteriorated.

For this reason, the electrode lead cutting unit of the third embodiment may include a laser oscillator 230. The laser oscillator 230 may apply a laser beam to a point of the electrode lead 12 to be cut in order to cut the electrode lead 12. Consequently, it is possible to minimize the amount of burrs or electrode particles generated on the cut surface of the electrode lead 12 at the time of cutting the electrode lead 12.

Those skilled in the art to which the present invention pertains should understand that the above embodiments are illustrative, not restrictive, in all aspects, since the present invention can be embodied in other concrete forms without changing the technical idea or essential features thereof.

The scope of the present invention is limited by the appended claims, rather than the detailed description of the present invention, and all changes or modifications derived from the meaning and scope of the claims and the equivalent concept thereof should be construed as falling within the scope of the present invention.

DESCRIPTION OF REFERENCE NUMERALS

50: Electrode lead cutting apparatus 100: Cell fixing unit
110: Suction plate 111: Vacuum hole
200: Electrode lead cutting unit 210: Cutting blade
211: First cutting blade 212: Second cutting blade
220: Guide block 230: Laser oscillator
300: Electrode lead fixing unit 400: Electrode lead supporting unit

INDUSTRIAL APPLICABILITY

According to an embodiment of the present invention, air is supplied to a point of an electrode lead to be cut through an air blower at the time of cutting the electrode lead such that the electrode lead is maintained in a horizontal state, whereby it is possible to minimize an error in the cutting length of the electrode lead at the time of cutting the electrode lead.

In addition, a supporting unit, such as a magnetic block, is disposed under the electrode lead at the time of cutting the electrode lead, whereby it is possible to prevent the point of the electrode lead to be cut from being tilted in the downward direction at the time of supplying air through the air blower.

The effects of the present invention are not limited to those mentioned above, and it should be understood that the effects of the present invention include all effects that can be inferred from the detailed description of the present invention or the construction of the invention recited in the claims.

The invention claimed is:

1. An electrode lead cutting apparatus for battery cells, the electrode lead cutting apparatus comprising:
   a cell fixing unit configured to fix a battery cell;
   an electrode lead fixing unit configured to blow air onto an electrode lead of the battery cell in order to fix a point of the electrode lead to be cut; and
   an electrode lead cutting unit configured to cut the point of the electrode lead to be cut,
   wherein the cell fixing unit is located on one side of the electrode lead cutting unit and the electrode lead fixing unit is located on another side of the electrode lead cutting unit, and
   wherein the electrode lead fixing unit is located closer to a distal end of the electrode lead than the electrode lead cutting unit.

2. The electrode lead cutting apparatus according to claim 1, wherein the cell fixing unit comprises a suction plate configured to suction the battery cell to the suction plate.

3. The electrode lead cutting apparatus according to claim 1, wherein
   the electrode lead cutting unit comprises a cutting blade configured to cut the electrode lead in a state of being in contact with the point of the electrode lead to be cut, and
   the cutting blade comprises a first cutting blade located above the point of the electrode lead to be cut and a second cutting blade located below the point of the electrode lead to be cut.

4. The electrode lead cutting apparatus according to claim 3, wherein
   the electrode lead cutting unit further comprises a guide block, and
   at least one of the first cutting blade and the second cutting blade to cut the point of the electrode lead is coupled to the guide block.

5. The electrode lead cutting apparatus according to claim 1, wherein the electrode lead cutting unit comprises a laser oscillator configured to apply a laser beam to the point of the electrode lead to be cut, and to cut the electrode lead using the laser beam.

6. The electrode lead cutting apparatus according to claim 1, further comprising an electrode lead supporting unit disposed under the electrode lead, the electrode lead supporting unit being configured to support the electrode lead.

7. The electrode lead cutting apparatus according to claim 6, wherein the electrode lead supporting unit comprises a magnetic block configured to fix the electrode lead using magnetic force.

8. An electrode lead cutting method comprising:
   loading a battery cell having an electrode lead exposed therefrom;
   blowing air from above the electrode lead onto the electrode lead to fix a point of the electrode lead to be cut; and
   cutting the fixed point of the electrode lead to be cut,
   wherein a location of the air blown against the electrode lead is closer to a distal end of the electrode lead than a location of the fixed point of the electrode lead to be cut.

9. The electrode lead cutting method according to claim 8, further comprising providing magnetic force from under the electrode lead to fix the electrode lead using a magnetic block to generate the magnetic force at a time of cutting the electrode lead.

10. The electrode lead cutting apparatus according claim 2, wherein the suction plate includes a hole formed through the suction plate.

11. The electrode lead cutting apparatus according to claim 2, wherein the suction plate includes a seating recess formed in one surface of the suction plate to seat the battery cell therein.

12. The electrode lead cutting apparatus according to claim 1, wherein the electrode lead fixing unit includes a blower to blow the air towards the electrode lead.

13. The electrode lead cutting method according to claim 8, wherein a blower included in an electrode lead fixing unit is used to blow the air towards the electrode lead.

* * * * *